United States Patent [19]

Ellis et al.

[11] 4,453,689

[45] Jun. 12, 1984

[54] ADJUSTABLE MOUNTING

[75] Inventors: Warren K. Ellis, Constance Bay; Donald T. Chadwick, Nepean, both of Canada

[73] Assignee: Northern Telecom Limited, Montreal, Canada

[21] Appl. No.: 281,992

[22] Filed: Jul. 10, 1981

[51] Int. Cl.$^3$ .............................................. E04G 3/00
[52] U.S. Cl. .............................. 248/288.1; 248/288.5
[58] Field of Search ............... 248/288.1, 288.5, 297.2, 248/664, 665, 669, 245, 125, 123, 192.1, 162.1, 161, 596, 598; 403/104, 171, 166, 81

[56] References Cited

U.S. PATENT DOCUMENTS

| | | | |
|---|---|---|---|
| Re. 17,880 | 11/1930 | Stoeltzlen | 403/371 |
| 1,782,660 | 11/1930 | Meyer | 403/166 |
| 2,184,988 | 12/1936 | Collier et al. | 248/596 |
| 2,283,324 | 5/1942 | Faber | 248/161 |
| 2,579,348 | 12/1951 | Taylor | 248/178 |
| 2,940,718 | 6/1960 | Beal | 248/297.2 |
| 3,004,743 | 10/1961 | Wenger | 248/161 |
| 3,358,951 | 12/1967 | Carter | 248/669 |
| 3,478,994 | 11/1969 | Ryall | 248/288.1 |
| 3,560,032 | 2/1971 | Cohen et al. | 403/104 |
| 4,214,724 | 7/1980 | Geiger | 248/288.5 |
| 4,278,223 | 7/1981 | Fauteux | 248/125 |
| 4,305,578 | 12/1981 | Disbrow et al. | 248/297.3 |
| 4,345,734 | 8/1982 | Studinger | 248/669 |

FOREIGN PATENT DOCUMENTS

| | | | |
|---|---|---|---|
| 0302951 | 12/1928 | United Kingdom | 248/242 |
| 0451680 | 8/1936 | United Kingdom | 248/161 |
| 0603581 | 6/1948 | United Kingdom | 248/161 |

Primary Examiner—William H. Schultz
Assistant Examiner—Ramon O. Ramirez
Attorney, Agent, or Firm—Sidney T. Jelly

[57] ABSTRACT

An adjustable mounting for supporting one body, such as a visual display unit, relative to another, such as a console, has a plunger attached to one of the bodies. The plunger extends into a chamber in a part of, or secured to, the other body and is frictionally located in the chamber, specifically by a collet of synthetic plastics material. In a preferred mounting arrangement for a visual display unit, the visual display unit is pivotally interconnected to a support at a position which is spaced from the longitudinal axis of the plunger towards the display screen of the unit. Then extension and retraction of the plunger tilt the display screen relative to the viewing axis. The plunger is preferably spring-loaded to compensate for increased loading on the plunger due to displacement of the center of gravity of the visual display unit as the unit tilts.

12 Claims, 4 Drawing Figures

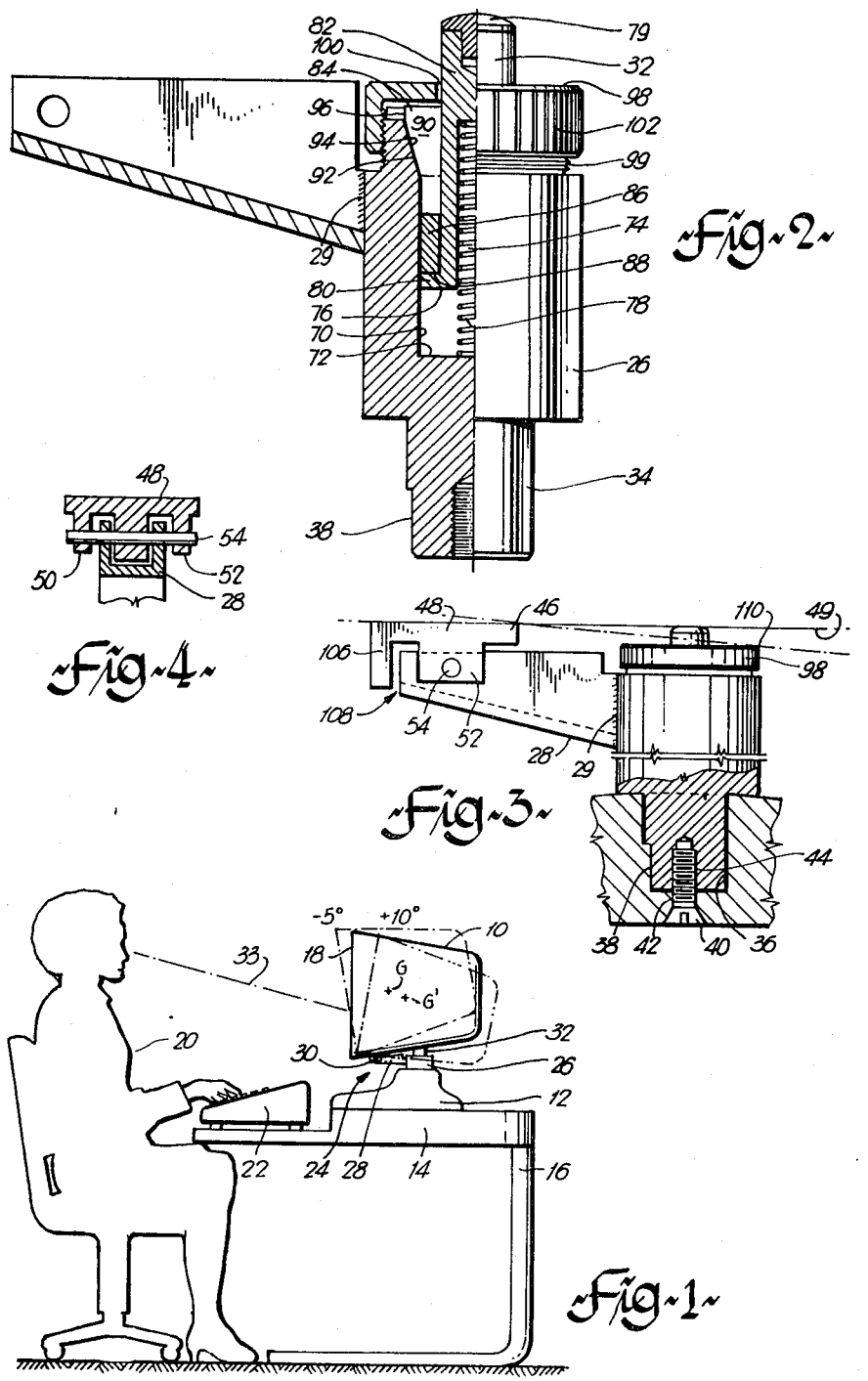

ADJUSTABLE MOUNTING

The invention relates to an adjustable mounting for supporting one body relative to, especially upon, another and is especially, but not exclusively, applicable to mounting a visual display unit upon a desk-type console at which a viewer/operator is to be seated.

Typically such consoles have a keyboard, or other viewer-operated controls, behind which the visual display unit projects upwards to present its display surface or screen to the viewer/operator.

Variations in lighting conditions and/or differences in the heights or seating positions of different operators make it desirable for the orientation of the display unit to be altered relative to the console, particularly so as to tilt the screen at least in the vertical plane through the viewing axis. This enables the viewer/operator to optimize the viewing angle and eliminate or reduce glare or reflections. It is also desirable for such adjustment to be made simply by pushing or pulling the visual display unit to the required position, which should then be maintained without the need for additional clamping or other securing devices.

Known devices for mounting such a visual display unit so as to afford the required adjustment are complicated and expensive to manufacture. It is an object of the present invention to provide an adjustable mounting device which will permit the aforesaid adjustment to be made, yet is simple and inexpensive to make.

According to the present invention an adjustable mounting device for supporting one body relative to another body comprises a pivotal coupling having a substantially horizontal pivot axis for coupling the bodies pivotally together; a plunger extending in a chamber and movable relatively thereto in any direction extending transversely to, and at a position spaced laterally from, said pivot axis; spring means for urging said plunger out of said chamber; frictional locating means for resisting movement of said plunger into and out of said chamber, wherein the spring means and frictional locating means are selected such that the sum of their respective forces upon said plunger are such as to counteract pivotal movement due to the weight of said one body.

As the plunger is depressed into the chamber, the force exerted upon it by the spring increases proportionately. This is of particular advantage where the device is mounted with the plunger supporting the underside of a tilting body such as a visual display unit. In such a case, as the body tolts backwards, its center of gravity will move rearwardly, increasing the force applied to the plunger. Suitable choice of spring stiffness may compensate, at least approximately, for this increase force avoiding the need to increase the frictional locating force progressively as the plunger retracts.

The frictional forces exerted between the plunger and chamber will be selected for a given orientation and body weight so that the stiction between the plunger and the chamber will be sufficient to maintain their relative positions in the absence of external forces applied to the bodies. To alter the separation or orientation of the bodies, it is then merely a matter of applying sufficient force to overcome the stiction, whereupon the plunger will move into or out of the chamber.

Such extension and retraction of the plunger relative to the chamber will control the pivot angle between the two bodies. In the specific application to mounting a VDU upon a base or support member, the pivot and plunger will be spaced apart one in front of the other relative to the display screen. Extension and retraction of the plunger will therefore tilt the visual display unit screen towards or away from the viewer.

In preferred embodiments the frictional locating means comprises a collet surrounding a part of the plunger extending within the chamber. The exterior of the collet comprises a conical bearing surface to cooperate with a complementary seating of the chamber. The frictional location force between the plunger and the chamber is then determined by the force with which the collet is urged axially into the chamber. Suitable means for urging the collet axially comprises a screw-threaded cap engaging a correspondingly screw-threaded part adjacent the mouth of the chamber, the plunger conveniently projecting through a central hole in the cap. The annular interior surface of the cap, surrounding the hole, then bears against the opposed end face of the collet.

An embodiment of the invention will now be described by way of example only and with reference to the accompanying drawings, in which:

FIG. 1 shows a viewer/keyboard operator seated at a console in front of a visual display unit (VDU) supported by an adjustable mounting device;

FIG. 2 is a part-sectional view of the mounting device;

FIGS. 3 and 4 are detail views of the mounting device and associated parts of the VDU cabinet and support.

FIG. 1 shows a visual display unit (VDU) 10 mounted upon a support in the form of a pedestal base 12 adjacent the rear of a console table 14 which is supported in cantilever fashion by a frame 16. The VDU 10 comprises a cathode ray tube with its display surface or screen 18 shown facing a viewer/operator 20 seated at the unsupported edge of the table 14, in such a position as to be able to operate a keyboard 22 on the table 14 in front of the VDU 10.

The VDU 10 is coupled to the pedestal base 12 by an adjustable mounting 24, comprising a cylindrical body part 26 upstanding from the base 12 with its cylindrical axis substantially vertical, and an arm 28 projecting radially from the part 26 towards the front of the VDU 10. The distal end of the arm 28 is connected to the underside of the VDU by a pivotal coupling 30. A piston or plunger member 32 projects upwards from the cylindrical part 26 and abuts the underside of the VDU at a position spaced rearwardly from the pivotal coupling 30. Thus extension and retraction of the plunger 32 relative to the cylindrical part 26 causes tilting of the VDU screen 18 towards or away from the viewer 20, altering the inclination of the screen 18 to the viewing axis indicated at 33.

The mounting 24 is shown in more detail in FIGS. 2, 3 and 4. At its lowermost end, the cylindrical part 26 has a spigot 34, of lesser diameter, which fits into a hole 36 in the pedestal base 12. The spigot 34 has a flat 38 at one side to cooperate with a corresponding flat, key, pin or other abutment (not shown) in the hole 36 and prevent relative rotation of the mounting device 10 and pedestal base 12. The spigot 34 is secured to the base 12 by a screw 40 extending through a clearance hole 42 in the underside of the base into a correspondingly screw-threaded hole 44 extending axially into the end of the spigot 34.

The pivotal coupling 30 includes a clevis 46 secured by it bight portion 48 to the underside 49 of the VDU 10 so that its arms 50 and 52 depend one to each side of the distal end portion of the radial arm 28, which is welded at its other end to the part 26 as indicated at 29. The clevis 46 is coupled to the radial arm 28 by a pivot pin 54 which extends through aligned holes in the arms 50 and 52, respectively, of the clevis 46 and transverse holes in the side walls of the arm 28, which is of U-shaped cross-section.

The plunger 32 is accommodated in a cylindrical chamber 70 in the body part 26. The chamber 70 is closed at its lower end 72. A hole 74 extends coaxially into the plunger 32 from its end face 76 opposed to the bottom of the chamber 70, and houses part of a compression spring 78, which acts between the chamber end wall 72 and the closed end of the hole 74 in the plunger to urge the latter away from the bottom of the chamber. At its upper end the plunger 32 has a tip 79 of synthetic plastics material, for example nylon, which abuts the underside of the VDU 10.

The plunger exterior is stepped to provide a radially outwardly projecting lip 80 at its lower end which is a sliding fit in the chamber 70. The remaining, lesser diameter, part 82 of the plunger 32 projects from the mouth of the chamber 70. The annular space thus provided between the plunger portion 82 and the chamber 70 is occupied by a collet 84 of synthetic plastics material. The collet 84 comprises a straight cylindrical part 86, the innermost annular end face 88 of which abuts the lip 80 to prevent withdrawal of the plunger 32 from the chamber. The collet 84 also comprises an outer part having a plurality of radial slits 90 (only one is shown) and an external conical surface 92 diverging towards the outer end of the collet 84. The interior wall of the chamber 70, adjacent its mouth, also diverges to provide a complementary conical seating 94 for the surface 92 of the collet 84. The wider end of the collet 84 comprises a further straight cylindrical portion 96 which projects beyond the end of the chamber 70.

An internally screw-threaded cap 98 fits over the mouth of chamber 70 and engages a corresponding externally screw-threaded end portion 99 of the cylindrical body part 26. The end of the plunger 32 extends through a hole 100 in the center of the screw cap 98. The exterior of the cap 98 is knurled, as at 102, allowing it to be rotated by hand to adjust the axial force exerted by the cap 98 on the wider end of the collet 84. The axial force thus applied to the collet will be translated by coaction of the conical surfaces 92 and 94 of the collet 84 and chamber 70, respectively, and thus determine the radial clamping force acting to urge the conical parts of the collet 84, between the slits 90, against the plunger 32. This, in turn, controls the frictional force between the collet 84 and the plunger 32, and hence between the latter and the chamber 70.

The slits 90 permit flexing of the conical parts of the collet and assist close control of the friction force exerted on the plunger 84. It should be noted, however, that the resilience of the synthetic plastics material of the collet is also significant in providing a wide, controllable range of friction force. In this respect, materials of the acetal type, for example that marketed under the trade name DELRIN 510AF, have been found especially suitable.

Following installation, for a particular VDU, the screw cap 98 will be adjusted so that the frictional force is low enough to be overcome readily by the operator pushing the VDU backwards, or by the return spring 78 when the weight of the VDU is removed from the plunger by the operator pulling the VDU forwards. On the other hand, the frictional force will be set high enough not to be overcome by the weight of the VDU alone. Thus, once the operator releases the VDU at a desired orientation, that position will be maintained.

In the described embodiment, the range of movement possible is limited to a total of about 15°, which has been found adequate for most applications. Preferably the device is arranged so that the screen 18 can tilt up to 5° forwards of the vertical and up to 10° rearward of the vertical, as indicated by broken lines in FIG. 1.

As shown in FIG. 3, angular movement in the forward direction is limited by a lug 106 which depends from the end of the bight portion 48 of the clevis 46 adjacent the end of the radial arm 28. When the VDU is in the intermediate tilt position illustrated in FIG. 3, the lug 106 is spaced slightly from the end of arm 28. When the clevis 46 rotates to the position corresponding to tilting of the VDU 10 to its forwardmost position, the lug 106 will abut the end of the arm 28, as at 108, to prevent further forward movement.

Tilting of the VDU 10 rearwardly is limited by the underside 49 of the VDU 10 abutting the screwed cap 98, as indicated at 110 in FIG. 3.

It is preferable for the center of gravity of the upper body to be approximately vertically aligned with its pivotal axis, so that the force required to move the body in either direction is minimal. Where, as in the illustrated embodiment, the upper body merely rests upon the plunger, the pivotal coupling should preferably be positioned so that it is always in front of the center of gravity, even when the body is in its forwardmost tilt position. This ensures that the body will not topple forwards.

Referring to FIG. 1, it will be noted that the center of gravity G moves rearwardly as the VDU tilts backwards, with a consequent increase in the force exerted on plunger 32 by the VDU. Reference G' indicates the position of the center of gravity when the VDU is in the rearmost tilt position. However, it will be appreciated that the opposing force exerted upon the plunger by return spring 78 will also increase due to compression of the spring as the plunger retracts. By careful selection of its characteristics, the spring can be made to compensate for, even equalize, the increasing force so that the upper body is balanced throughout its range of movement.

It will be appreciated that the frictional force required to locate the plunger will vary for different units or, for the same unit, due to component wear over a period of use. An advantage of preferred embodiments of the invention is that the frictional locating force can be adjusted easily to take account of such variations; in the specific embodiment simply by adjusting the screwed cap.

A further advantage of specific embodiments is that greater differences in weight of the VDU can be accommodated simply by exchanging the spring 78.

Various modifications of the specific embodiment are envisaged within the scope of the invention. For example the plunger might be attached to the visual display unit, perhaps by a pivotal coupling. Then the lip 80, cooperating with the end of collet 84, could serve to limit forward movement of the body, obviating the use of an external stop such as the lug 106 on clevis 46. Also, movement in the rearward direction could be limited by the plunger abutting a stop in, or the bottom of, the chamber, rather than by the upper body abutting the screw cap.

Whilst, in the illustrated embodiment, the mounting prevents relative rotation of the bodies, it should be noted that the mounting could be readily modified to permit such rotation, if so desired.

One advantage of the specific embodiments in which the mounting device comprises a separate unit releasably attached to the two bodies, is that the device can be installed into existing installations. However, it should be appreciated that either or both of the relatively movable components of the device, i.e., the plunger and the chamber housing for the plunger, could be integral with the associated body or bodies.

What is claimed is:

1. An adjustable mounting arrangement for supporting one body relative to another body, comprising:
    a pivotal coupling, having a pivot axis, for coupling the bodies pivotally together;
    a plunger extending in a chamber and movable relative thereto in a direction extending transversely to, and at a position spaced laterally from, said pivot axis, such that pivoting of said one body about said pivot axis is accompanied by the plunger moving into or out of said chamber;
    spring means for urging said plunger out of said chamber; and
    frictional locating means for resisting movement of said plunger into and out of said chamber; wherein the spring means and frictional locating means are selected such that the sum of their respective forces upon said plunger are such as to counteract pivotal movement due to the weight only of said one body.

2. A mounting as defined in claim 1 wherein the frictional locating means is adjustable to vary the frictional locating force exerted between the plunger and the chamber.

3. A mounting as defined in claim 2, wherein the frictional locating means comprises a collet surrounding a part of the plunger extending within the chamber.

4. A mounting as defined in claim 3, wherein the chamber interior comprises a conical seating diverging towards the chamber mouth, the collet exterior having a corresponding conical surface to cooperate with said seating, the mounting further comprising means for urging the collet axially into the chamber such that the conical surface of the collet cooperates with the conical seating of the chamber.

5. A mounting as defined in claim 4, wherein the means for urging the collet axially comprises a screw-threaded cap cooperating with a correspondingly screw-threaded part adjacent the mouth of the chamber.

6. A mounting as defined in claim 4, wherein the conical part of the collet has at least one radial 90 slot.

7. A mounting as defined in any preceding claim, wherein the collet is formed at least partly of synthetic plastics material.

8. A mounting as defined in claim 1, wherein the pivotal coupling and chamber comprise integral parts of a member having means whereby the member can be secured to said one of the bodies.

9. A mounting as claimed in claim 8, wherein the chamber comprises a cylindrical cavity extending into the member from one face thereof, the securing means comprising a spigot extending from the member away from said face, the pivot coupling part being provided on an arm 23 extending laterally from the member.

10. In combination, a mounting as defined in claim 1, a visual display unit, and a console, said one body being the visual display unit and said another body being said console, the arrangement being such that the plunger engages the underside of the visual display unit and in moving the visual display unit tilts in a plane extending substantially vertically and perpendicular to the display surface of the unit.

11. In combination, a mounting as defined in claim 1, and said body and said another body, the one body being arranged above said another body, the pivotal coupling between the bodies being positioned so that the pivot axis is at or against the vertical plane through the center of gravity of the upper body in all positions of normal adjustment of the mounting.

12. A combination as defined in claim 11, wherein the end of the plunger projects from the chamber and abuts said one body.

* * * * *